United States Patent
Barkley et al.

(10) Patent No.: US 8,745,184 B1
(45) Date of Patent: Jun. 3, 2014

(54) WIRELESS COMMUNICATION PROVISIONING USING STATE TRANSITION RULES

(75) Inventors: Scott Barkley, San Mateo, CA (US); Amit Gupta, Livermore, CA (US); Zhongling Li, Fremont, CA (US)

(73) Assignee: Jasper Wireless, Inc., Mountain View, CA (US)

( * ) Notice: Subject to any disclaimer, the term of this patent is extended or adjusted under 35 U.S.C. 154(b) by 967 days.

(21) Appl. No.: 11/804,582

(22) Filed: May 18, 2007

(51) Int. Cl.
G06F 15/173 (2006.01)

(52) U.S. Cl.
USPC ............... 709/223; 709/203; 455/18; 455/19; 455/20

(58) Field of Classification Search
USPC ........................... 709/223, 203; 455/418–420
See application file for complete search history.

(56) References Cited

U.S. PATENT DOCUMENTS

| | | | |
|---|---|---|---|
| 5,353,340 A | 10/1994 | Kunz | |
| 5,379,423 A * | 1/1995 | Mutoh et al. ........................ | 1/1 |
| 5,734,699 A | 3/1998 | Lu et al. | |
| 5,854,982 A | 12/1998 | Chambers et al. | |
| 5,943,619 A | 8/1999 | Coyne et al. | |
| 6,124,799 A | 9/2000 | Parker | |
| 6,584,310 B1 | 6/2003 | Berenzweig | |
| 6,997,379 B2 * | 2/2006 | Boyce et al. ................. | 235/380 |
| 7,027,813 B2 | 4/2006 | Hicks et al. | |
| 7,184,768 B2 | 2/2007 | Hind et al. | |
| 7,190,969 B1 * | 3/2007 | Oh et al. ........................ | 455/551 |
| 7,266,371 B1 | 9/2007 | Amin et al. | |
| 7,274,933 B2 | 9/2007 | Zinn et al. | |
| 7,366,510 B2 | 4/2008 | Gunaratnam et al. | |
| 7,395,083 B2 | 7/2008 | Buckley | |
| 7,668,573 B2 * | 2/2010 | Laroia et al. .................. | 455/574 |
| 7,676,552 B2 * | 3/2010 | Eilam et al. .................... | 709/218 |
| 7,788,352 B2 * | 8/2010 | Breuer et al. ................. | 709/221 |
| 7,987,449 B1 * | 7/2011 | Marolia et al. ................ | 717/120 |
| 8,112,549 B2 * | 2/2012 | Srinivasan et al. ............ | 709/248 |
| 8,149,749 B2 * | 4/2012 | Maeda et al. ................. | 370/311 |
| 2002/0154632 A1 | 10/2002 | Wang et al. | |

(Continued)

FOREIGN PATENT DOCUMENTS

| | | |
|---|---|---|
| EP | 1229751 A1 | 8/2002 |
| EP | 1392007 A1 | 2/2004 |

(Continued)

OTHER PUBLICATIONS

ETSI TS 100 922 V7.1.1 (Jul. 1999) Digital Cellular Telecommunication Systems (Phase 2+); Subscriber Identity Modules (SIM) (GSM 02.17 version 7.1.1 Release 1998).

(Continued)

*Primary Examiner* — Duyen Doan
(74) *Attorney, Agent, or Firm* — Blakely Sokoloff Taylor & Zafman

(57) ABSTRACT

A method for wireless communication provisioning is disclosed. A first wireless communication provisioning state associated with one or more identifiers is defined. A second wireless communication provisioning state associated with one or more identifiers is defined. A state transition rule is defined, wherein the state transition rule defines a transition between the first wireless communication provisioning state and the second wireless communication provisioning state, wherein the first wireless communication provisioning state and the second wireless communication provisioning state are based on the lifecycle of the service of a wireless communication device associated with the first and second wireless communication provisioning states.

24 Claims, 7 Drawing Sheets

(56) References Cited

U.S. PATENT DOCUMENTS

| | | |
|---|---|---|
| 2002/0197991 A1 | 12/2002 | Anvekar et al. |
| 2003/0022689 A1 | 1/2003 | McElwain et al. |
| 2003/0027581 A1 | 2/2003 | Jokinen et al. |
| 2003/0037755 A1 | 2/2003 | Nomura |
| 2003/0041131 A1* | 2/2003 | Westerinen et al. .......... 709/221 |
| 2003/0064723 A1 | 4/2003 | Thakker |
| 2003/0157935 A1 | 8/2003 | Kauhanen |
| 2004/0043752 A1 | 3/2004 | Matsumura |
| 2004/0097230 A1 | 5/2004 | Natarajan et al. |
| 2004/0203744 A1 | 10/2004 | Hick et al. |
| 2005/0079863 A1 | 4/2005 | Macaluso |
| 2005/0097595 A1 | 5/2005 | Lipsanen et al. |
| 2005/0113088 A1 | 5/2005 | Zinn et al. |
| 2005/0255880 A1* | 11/2005 | Inoue .......................... 455/552.1 |
| 2006/0019647 A1 | 1/2006 | Muhonen et al. |
| 2006/0030315 A1* | 2/2006 | Smith et al. ................ 455/432.3 |
| 2006/0173976 A1 | 8/2006 | Vincent et al. |
| 2006/0205434 A1 | 9/2006 | Tom et al. |
| 2007/0026861 A1 | 2/2007 | Kuhn et al. |
| 2007/0083528 A1* | 4/2007 | Matthews et al. ............... 707/10 |
| 2009/0029684 A1 | 1/2009 | Rosenblatt et al. |

FOREIGN PATENT DOCUMENTS

| | | |
|---|---|---|
| EP | 1672945 A1 | 6/2006 |
| FR | 2790161 A1 | 8/2000 |
| FR | 2814029 A1 | 3/2002 |
| GB | 2389745 A | 12/2003 |
| WO | 0070900 A1 | 11/2000 |
| WO | 0137602 A1 | 5/2001 |
| WO | 0221872 A1 | 3/2002 |
| WO | 02067563 A1 | 8/2002 |

OTHER PUBLICATIONS

3GPP TS 03.20 V9.0.0 (Jan. 2000) 3rd Generation Partnership Project: Digital Cellular Telecommunication System (Phase 2+) Security related network functions (Release 2000).

Office action in a corresponding U.S. Appl. No. 13/413,516 dated Feb. 7, 2013.

* cited by examiner

WIRELESS COMMUNICATION PROVISIONING USING STATE TRANSITION RULES

BACKGROUND OF THE INVENTION

Mobile data communications can enable a wide variety of services. However, mobile data providers, such as cell phone providers, mobile virtual network operators (MVNO's), or mobile virtual network enablers (MVNE's), have processes—for example, provisioning processes—that are tailored for standard cell phone services. In particular, an equipment provider or another type of customer for mobile data communications may desire to provide equipment enabled to use mobile data communications. In order to test that the equipment is fully functional with a mobile data communications provider, the equipment provider in the current environment most likely will be required to completely activate the equipment (i.e. provision it) including establishing a service plan with customer billing. When the testing is complete, the service plan will likely be terminated, and the final customer will be required to reactivate the service plan with customer billing. It would be beneficial if the mobile data providers' processes—for example, provisioning—could be tailored for the needs of customers of mobile data communications.

BRIEF DESCRIPTION OF THE DRAWINGS

Various embodiments of the invention are disclosed in the following detailed description and the accompanying drawings.

DETAILED DESCRIPTION

Figure 1:
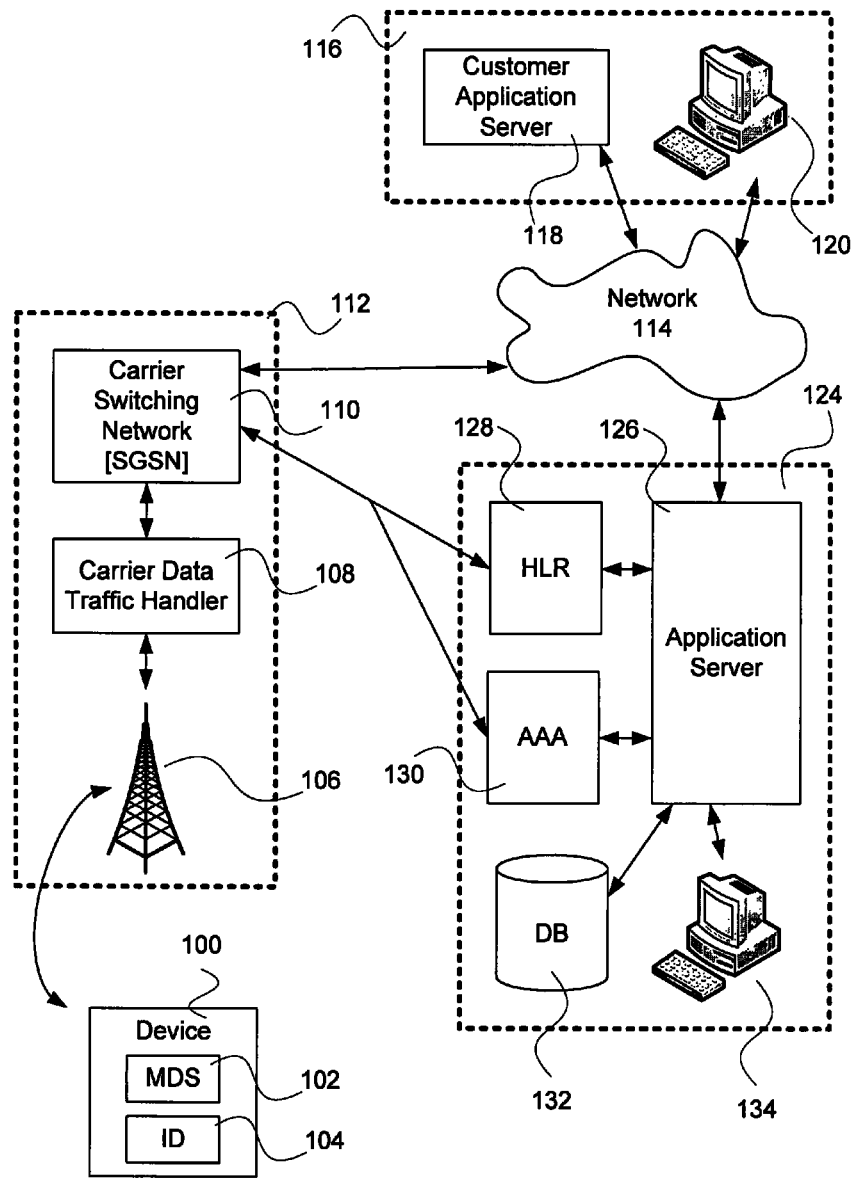
FIG. 1 illustrates a block diagram of an embodiment of a system for mobile data communication provisioning.

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Wireless communication provisioning using state transition rules associated with an identifier is disclosed. A first state associated with one or more identifiers is defined. A second state associated with one or more identifiers is defined. A state transition rule is defined between the first and second states. In some embodiments, an identifier of the one or more identifiers is a subscriber identity module (SIM). In some embodiments, a plurality of states are defined, a plurality of state transition rules are defined, and a group of states and transition rules are selected and associated with one or more identifiers. In some embodiments, wireless communications comprise mobile data, mobile cellular communications, or any other appropriate wireless communications.

In some embodiments, a customer organization defines a sequence of states for devices that communicate data with a customer application server via one or more wireless carrier networks. The provider enables the communication via the wireless carrier networks. The plurality of states enables the activity of provisioning of a customer device or provider device used in the data communication with appropriate billing, access, and/or authorization for each activity especially with regard to testing, activation, deactivation, etc.

FIG. 1 illustrates a block diagram of an embodiment of a system for mobile data communication provisioning. In the example shown, device 100 comprises a mobile device that communicates data. Device 100 includes a mobile data service (MDS) 102—for example, general packet radio service—and an identifier (ID) 104—for example, a subscriber identifier module. Data can be transmitted and received by device 100 using MDS 102. Device 100 is identified using ID 104 and associated with a user or customer. Transmissions and receptions of data communicate with carrier network 112, which is associated with MDS 102. In various embodiments, the carrier network associated with MDS 102 comprises a mobile carrier network, a cell phone network, a messaging network, wireless communication network, or any other appropriate network for communicating data to a mobile device.

Carrier network 112 includes carrier switching network 110 (e.g., SGSN—serving General Packet Radio Services (GPRS) support node —used in Global System for Mobile Communications (GSM) networks), carrier data traffic handler 108 (e.g., GRX—a GPRS roaming exchange and/or SS7—signaling system 7 system), and a plurality of carrier towers—represented in FIG. 1 by tower 106. Communications of data traffic to and from device 100 are received by carrier network 112 by a carrier tower, which communicates the data traffic with carrier data traffic handler 108. Carrier data traffic handler 108 communicates data traffic with carrier switching network 110. Carrier switching network 110 can communicate with network 114, and Authentication Center/Home Location Register (HLR) 128 and Authentication, Authorization, and Accounting (AAA) Server (e.g., a Radius server) 130 of provider system 124.

Network 114 enables communication with customer system 116, which includes customer application server 118 and customer administrator 120. In some embodiments, network 114 comprises the internet, a local area network, a wide area network, a wired network, a wireless network, or any other appropriate network or networks for communicating with customer system 116. Customer application server 118 receives data from and transmits data to device 100 regarding the customer's services or products. In various embodiments, the customer's services includes transaction related services, monitoring services, and/or location tracking services. In some embodiments, a state transition rule defining transition from one provisioning state to another provisioning state associated with device 100 is implemented on customer application server 118. In some embodiments, a state transition rule defining transition from one provisioning state to another provisioning state associated with device 100 is not known to device 100.

Provider system 124 includes HLR 128, AAA server 130, application server 126, database (DB) 132, administrator 134. Provider system 124 enables customer services by enabling data communication services via the carrier network with device 100. HLR 128 enables communication with the provider system by indicating if device 100 is allowed to have data communication through carrier network 112 with customer system 116. AAA server 130 enables specific permissions that are available regarding data communications between device 100 and customer system 116 via carrier network 112. Application server 126 enables provisioning and billing for the provider. Provisioning comprises enabling devices such as device 100 to have mobile data communication services using a mobile carrier network. DB 132 includes information related to provisioning and billing for the provider. Administrator 134 administrates provider system. Customer system administrator 120 communicates with provider application server 126 to administrate customer system usage, billing, provisioning for data communication service of carrier network 112 enable by provider 124. In some embodiments, functionality of HLR 128 and AAA server 130 are performed by the same server, are partitioned between two servers but not exactly as described herein, or any other server configuration to achieve the same functionality.

Figure 2:
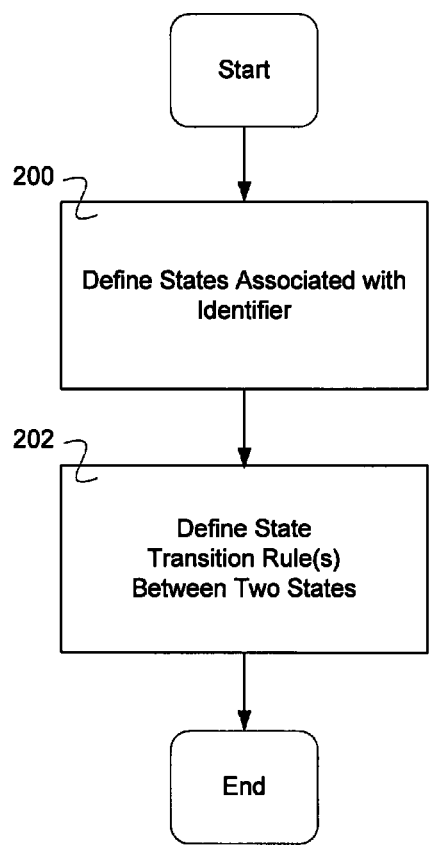
FIG. 2 is a flow diagram illustrating an embodiment of a process for mobile data communication provisioning.

FIG. 2 is a flow diagram illustrating an embodiment of a process for mobile data communication provisioning. In some embodiments, the process of FIG. 2 helps provision device 100 of FIG. 1 such that mobile data and/or wireless communications is available via carrier network 112 to customer system 116. In the example shown, in 200 states associated with one or more identifiers are defined. States that are associated with one or more identifiers can include test ready, inventory, activation ready, activated, deactivated, retired, return merchandise authorization (RMA), suspend, fraud review, purged, and/or any other appropriate states. In various embodiments, the identifier comprises a SIM, an International Circuit Card Identifier (ICCID), an international mobile subscriber identifier (IMSI), a customer identifier, a user identifier, or a device identifier. In various embodiments, the one or more identifiers comprises an identifier associated with a user, a customer, a company, an organization, etc. or a group of identifiers associated with a user, a customer, a company, an organization, etc.

In some embodiments, one or more states are based on the lifecycle of the service of a wireless communication device.

A test ready state can be used to allow a manufacturer to test a SIM, or a device with a SIM, and its network communication infrastructure before delivering the SIM, or device with a SIM, to an end user, a retail location, or a distributor. A test ready state can be a default state for a SIM that allows authentication and authorization with a provider's HLR and AAA server, but does not have any billing associated with it. A SIM in a test ready state is able to conditionally transact data, voice, and/or Short Message Service (SMS) communications—for example, some limits may be placed on the communications while in this state such as: communication may occur up to a maximum data transmitted/received amount or up to a maximum number of days since the initial data communication. A test ready state may have no prerequisite state, have no limitation to a next state (e.g., all states allowed as next state), have no exclusivity rule, be a required state, and be allowed to have automatic and/or manual transitions.

An inventory state can be used to allow a SIM to be placed in a device and associated with an identifier of the device (e.g., a terminal identifier or a point of sale terminal identifier). An inventory state cannot coexist with an activation ready state. An inventory state cannot connect with the network and requires a manual change in order to change state. An inventory state may have a test ready state as a prerequisite, have no limitation to a next state (e.g., all states allowed as next state), have an exclusivity rule in that it cannot coexist with an activation ready state, not be a required state, and be allowed only to have manual transitions.

An activation ready state can be used to allow a SIM to be ready to be activated. An activation ready state will authenticate and authorize with the HLR and AAA server of the provider system, but no billing will occur. After the first data communication (e.g., first packet data protocol (PDP) context communication), the SIM state will automatically change to an activated state. An activation ready state may have a test ready state or inventory state as a prerequisite, have no limitation to a next state (e.g., all states allowed as next state), have an exclusivity rule in that it cannot coexist with an inventory state, not be a required state, and be allowed to have an automatic transition to an activated state or a manual transition to other states.

An activated state can be used to allow a SIM, or a device with a SIM, to be used by a user. In an activated state the SIM will authenticate and authorize on the HLR and AAA server of the provider system. Billing commences immediately on changing to this state. The provider system may check to make sure that the proper information is contained on the HLR and AAA server databases as well as the billing databases. In some cases, the checks will include checking the identifiers (e.g., SIM, international mobile subscriber identifier (IMSI), customer identifier, device identifier, etc.). An activated state may have a test ready state, inventory, or activation ready state as a prerequisite, have possible next states of deactivated, purged, or retired, have no exclusivity rule, not be a required state, and be only allowed to have a manual transition to a next state.

A deactivated state can be used to allow a SIM, or a device with a SIM, to be deactivated by the user. In a deactivated state the SIM will not be allowed to authenticate and will not be billed. The AAA server of the provider system and the gateway GPRS support node (GGSN) of carrier networks will be sent a notification (e.g., a packet) informing them that the SIM has been deactivated. An deactivated state may have a activated state as a prerequisite, have possible next states of activated, purged, or retired, have no exclusivity rule, not be a required state, and be only allowed to have a manual transition to a next state.

A retired state can be used to allow a SIM, or a device with a SIM, to be retired by the provider or the user. In a retired state the SIM will not be allowed to authenticate and billing ends. A retired state may have any state as a prerequisite except purged, have any possible next states (i.e., all states possible), have no exclusivity rule, not be a required state, and be only allowed to have a manual transition to a next state.

A purged state can be used to allow a SIM, or a device with a SIM, to be purged by the provider. In a purged state the SIM will not be allowed to authenticate and the SIM is removed from the system (e.g., IMSI permanently removed from the HLR of the provider system). A purged state may have any state as a prerequisite, have no possible next states, have no exclusivity rule, not be a required state, and be not allowed to have any transitions to a next state.

In some embodiments, a state is defined by a customer. In some embodiments, the state is defined using an Internet-based service.

In some embodiments, a state definition does not support communication sessions and a transition to that state will terminate existing open communication sessions.

In some embodiments, a first wireless communication provisioning state allows a communication device to pass traffic without incurring any billing charges, and an associated state transition rule allows an automated transition to a second provisioning state where the second provisioning state incurs billing charges. In some embodiments, a first wireless communication provisioning state allows a communication device to pass traffic without incurring any billing charges, and an associated state transition rule allows an automated transition to the second provisioning state, where the second provisioning state does not allow the communication device to pass traffic.

In 202, state transition rule(s) between two states is/are defined. A transition from one state to another may occur automatically on a predetermined condition or manually. If the transition is based on a condition is met (e.g., upon first data communication—packet data protocol context established), the state will automatically change from one to another (e.g., activation ready state to activated state). In various embodiments, the transition condition is based on one or more of the following: a predetermined amount of elapsed time since a prior state transition, an amount of service usage above a predetermined amount of service usage, one or more service signalings, or any other appropriate condition. In various embodiments, the condition is based on an exclusivity rule, a state rule, a communication data transfer, or any other appropriate condition. A manual change from one state to another requires an intervention directly from the provider system—for example, an action through a manager portal, by uploading a file to the SIM or device with the SIM, or an application programming interface (API) call.

In various embodiments, a state transition rule can be defined for an individual device or a group of devices, or different rules can be defined for different individual devices or different groups of devices, or any other appropriate combination as appropriate for meeting the needs of a supplier of devices.

In some embodiments, a group of states are defined and a group of transition rules are defined, and then a selection of states and transition rules are associated with one or more identifiers.

In some embodiments, a customer selects a state transition rule. In some embodiments, a customer defines a state transition rule. In various embodiments, the state transition rule is selected and/or defined using an Internet-based service, using a local program interface, or any other appropriate manner of selecting and defining a state transition rule.

In some embodiments, a state transition rule when activated terminates existing communication sessions.

Figure 3:
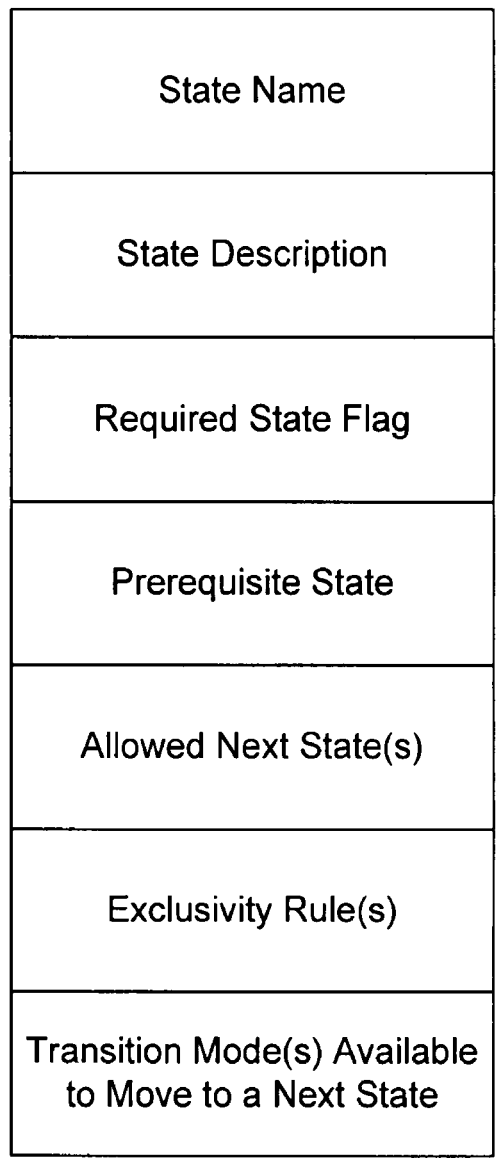
FIG. 3 is a block diagram illustrating an embodiment of a state definition.

FIG. 3 is a block diagram illustrating an embodiment of a state definition. In some embodiments, a state is associated with an identifier—for example, a SIM, a device identifier (e.g., an international mobile equipment identifier), a vendor identifier, or any other appropriate identifier. In the example shown, a state definition includes state name, state description, required state flag, prerequisite state, allowed next state(s), exclusivity rule, and transition mode(s) available that describe conditions allowing transitions between states. For example, a test ready state has: a) a state name of test ready; b) a state description of SIM is able to tested in its operation with the network by a manufacturer in a limited manner without being billed; c) a required state flag indicating that the test ready state is required; d) there is no prerequisite state for the test ready state; e) allowed next states from test ready are inventory, activation ready, activated, retired, or purged; f) there is no exclusivity rule for the test ready state; and g) the transition modes available are automatic to either an inventory state or an activation ready state based on an exclusivity rule or manual change.

Figure 4:
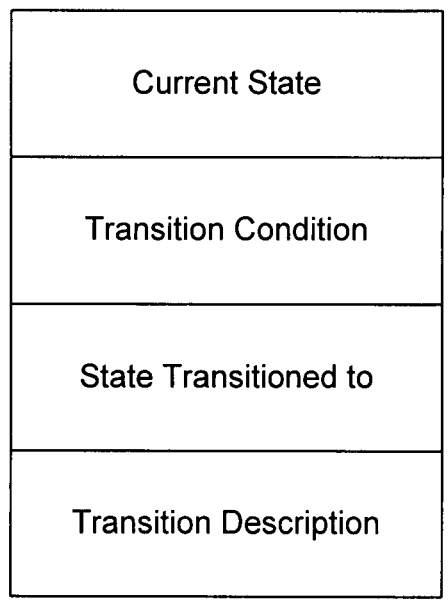
FIG. 4 illustrates an embodiment of a state transition rule definition.

FIG. 4 illustrates an embodiment of a state transition rule definition. In various embodiments, a state transition rule definition is associated with a state associated with an identifier or an identifier. In the example shown, a state transition rule definition includes current state, transition condition, state transitioned to, and transition description. For example, a SIM can be manually changed from an inventory state to an activation ready state when the device that the SIM is in is deployed by selling the unit to a retail customer, by having a service provider place the unit in the field, or by any other appropriate manner. For another example, a SIM can be automatically changed from an activation ready state to an active state when a PDP context is established and data is communicated to and from the SIM, or device with the SIM in it.

Figure 5:
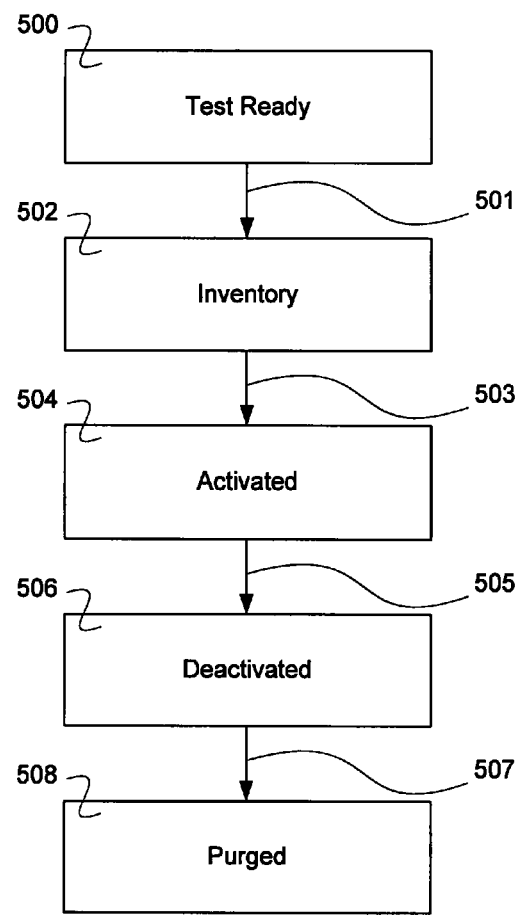
FIG. 5 is a flow diagram illustrating an embodiment of states of a channel sale model for provisioning and the transitions between the states.

FIG. 5 is a flow diagram illustrating an embodiment of states of a channel sale model for provisioning and the transitions between the states. In some embodiments, the starting default state of a SIM is the test ready state. In the example shown, in test ready state 500 a device is ready for testing. The SIM is shipped in the test ready state to an original equipment manufacturer (OEM)—for example, a customer wanting to use the connectivity services provided by the provider which enables a user's device to have data communication to the customer via one or more carrier networks. In test ready state 500, the SIM is allowed to provision and establish a PDP session (e.g., it can connect to GGSN of a carrier network, connect to internet, and connect to the customer's application server). When the SIM is in the test ready state, no billing to the OEM occurs. This connectivity is allowed for until the transition 501. Transition 501 from the test ready state is either a manually triggered transition or an automatically triggered based on a condition where the condition is the when the SIM has reached: 1) a maximum number of PDP sessions has occurred—for example, 10; 2) a maximum amount of data has been transmitted/received to and from the SIM/device via the carrier network—for example, 100 Kbytes; or 3) a maximum amount of time has elapsed since the first PDP context in this test ready state—for example, 90 days. When the transition is triggered, then the SIM switches to inventory state 502.

In inventory state 502, a device is waiting to be transferred to a user. In this state, no connectivity is enabled, and no billing occurs. The state is maintained until transition 503.

Transition 503 occurs when the OEM or the customer or its channel service providers manually triggers a state change. When the state change is triggered, the SIM is changed to activated state 504. In activated state 504, a device is being used by user. In activated state 504, the SIM is able to establish a PDP session and connect and transfer data to a customer application server via a carrier network. The user is billed for the service provided by the provider. Billing information is provided to the customer by gathering the relevant data from the network carriers and the provider's data bases. The SIM remains in the active state until triggered to transition. Transition 505 may be triggered manually or automatically. In various embodiments, transition 505 is triggered automatically by a maximum number of connections allowed, a maximum amount of data transferred, a maximum amount of time since the start of PDP sessions, or any other appropriate automatic trigger condition. In some embodiments, the user or the customer can also manually trigger transition 505 to a deactivated state 506.

In deactivated state 506, a device is finished being used as requested by an end user or by a customer system request by being in a deactivated state. In deactivated state 506, the SIM is not able to connect and establish a PDP session. While in deactivated state 506, there is no billing for connectivity. Transition 507 can be triggered automatically (e.g., after a period of time) or manually (e.g., by the customer). When transition 507 is triggered, the SIM changes state to purged state 508. In purged state 508, the SIM and the device the SIM is in, is removed from the system. In purged state 508, the SIM is not able to connect and establish a PDP session. There is no billing associated with the trigger or the state. Accounting for the customer may remove the item from inventory or asset lists. Purged state 508 automatically removes the IMSI and International Circuit Card Identifier (ICCID) from the HLR of the provider system.

Figure 6:
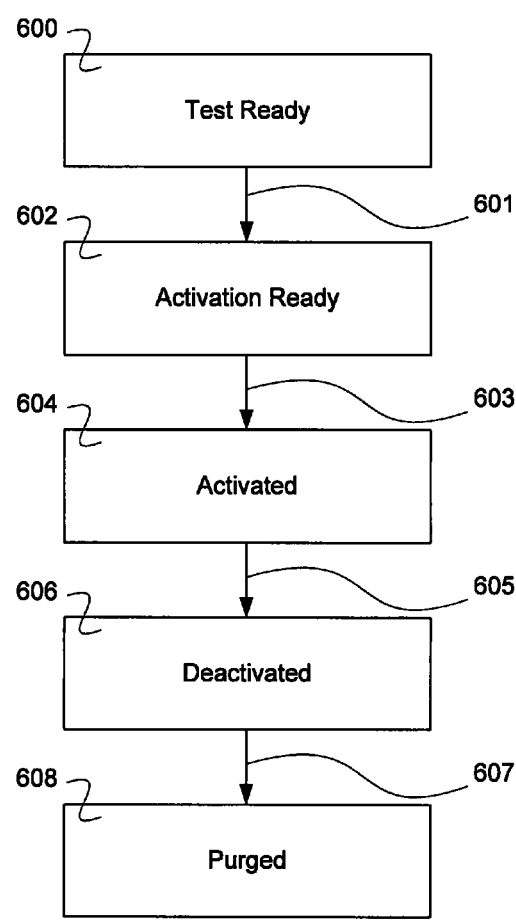
FIG. 6 is a flow diagram illustrating an embodiment of states of a retail sale model for provisioning and the transitions between the states.

FIG. 6 is a flow diagram illustrating an embodiment of states of a retail sale model for provisioning and the transitions between the states. The states and transitions in FIG. 6 are similar to the states and transitions in FIG. 5 except for the activation ready state. In some embodiments, the starting default state of a SIM is the test ready state. In the example shown, in test ready state 600 a device is ready for testing. The SIM is shipped in the test ready state to an original equipment manufacturer (OEM)—for example, a customer wanting to use the connectivity services provided by the provider which enables a user's device to have data communication to the customer via one or more carrier networks. In test ready state 600, the SIM is allowed to provision and establish a PDP session (e.g., it can connect to GGSN of a carrier network, connect to internet, and connect to the customer's application server). When the SIM is in the test ready state, no billing to the OEM occurs. This connectivity is allowed for until the transition 601. Transition 601 from the test ready state is either a manually triggered transition or an automatically triggered based on a condition where the condition is the when the SIM has reached: 1) a maximum number of PDP sessions has occurred—for example, 5; 2) a maximum amount of data has been transmitted/received to and from the SIM/device via the carrier network—for example, 1 Mbytes; or 3) a maximum amount of time has elapsed since the first PDP context in this test ready state—for example, 1 year. When the transition is triggered, then the SIM switches to activation ready state 602.

In activation ready state 602, a device is waiting to be transferred to a user. In various embodiments, the activation ready state is set after testing by the OEM when the device is being shipped from the OEM to retail locations, distribution partners, directly to end users, or when the SIM, or device with the SIM, is about to be in the end users hands but is not ready to have billing/service fully implemented. In this state, SIM connectivity is enabled, and a PDP session can be established. Upon the first PDP session occurring transition 603 is triggered. When the state change is triggered, the SIM is changed to activated state 604. In activated state 604, a device is being used by user. In activated state 604, the SIM is able to establish a PDP session and connect and transfer data to a customer application server via a carrier network. The user is billed for the service provided by the provider. Billing information is provided to the customer by gathering the relevant data from the network carriers and the provider's data bases. The SIM remains in the active state until triggered to transition. Transition 605 may be triggered manually or automatically. In various embodiments, transition 605 is triggered automatically by a maximum number of connections allowed, a maximum amount of data transferred, a maximum amount of time since the start of PDP sessions, or any other appropriate automatic trigger condition. In some embodiments, the user or the customer can also manually trigger transition 605 to a deactivated state 606.

In deactivated state 606, a device is finished being used as requested by an end user or by a customer system request by being in a deactivated state. In deactivated state 606, the SIM is not able to connect and establish a PDP session. While in deactivated state 606, there is no billing for connectivity. Transition 607 can be triggered automatically (e.g., after a period of time) or manually (e.g., by the customer). When transition 607 is triggered, the SIM changes state to purged state 608. In purged state 608, the SIM and the device the SIM is in, is removed from the system. In purged state 608, the SIM is not able to connect and establish a PDP session. There is no billing associated with the trigger or the state. Accounting for the customer may remove the item from inventory or asset lists. Purged state 608 automatically removes the IMSI and International Circuit Card Identifier (ICCID) from the HLR of the provider system.

Figure 7:
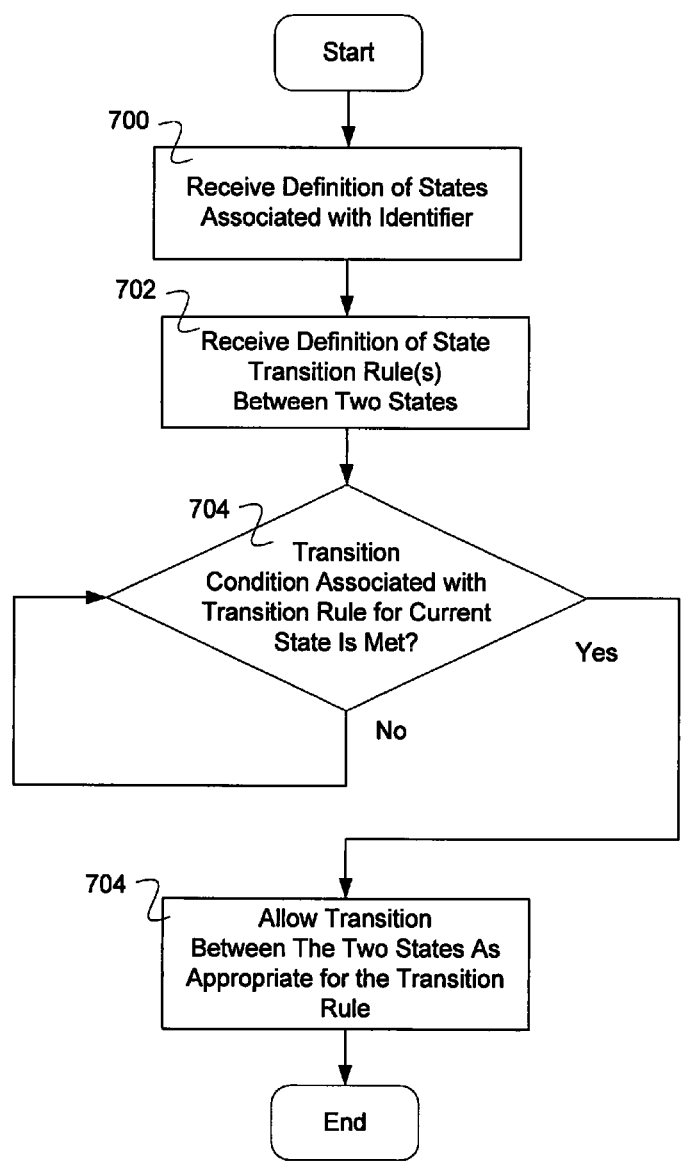
FIG. 7 is a flow diagram illustrating an embodiment of a process for provision wireless communication.

FIG. 7 is a flow diagram illustrating an embodiment of a process for provisioning wireless communication. In the example shown, in 700 definitions for states associated with an identifier are received. In some embodiments, state definitions and/or selections are received using an internet-based application. In various embodiments, state definitions are the same or different for different identifiers. In various embodiments, a state for provisioning (e.g., a device) allows billing, allows communication sessions, allows activation, does not allow billing, does not allow communication sessions, does not allow activation, or any other appropriate action associated with a state. In 702, definition(s) for state transition rule(s) between two states is/are received. In some embodiments, state transition rule definitions and/or selections are received using an internet-based application. In various embodiments, the transitions are automatic or manual and are triggered with a transition condition. In various embodiments, the automatic and/or manual transition conditions include an elapsed time from a prior state, prior transition, or prior specific/any communication, an absolute time, an absolute date, after a predetermined amount of traffic, before a predetermined level of traffic is reached, after communication with a specific location, number, device, service center, after sending a service indication, a system message, after receipt of a service message, condition, communication from a specific location, device, server, service center, or any other appropriate transition condition. In 704, it is determined if a transition condition associated with a transition rule for current state is met. In the event that an appropriate transition condition has not been met, control stays with 704. In the event that an appropriate transition condition is met, then in 706 allow transition between the two states as appropriate for the transition rule. In some embodiment, the implementation of provisioning states, state transition rule enforcement, and evaluation of transition conditions takes place on a server that communicates with a wireless network and wireless device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for wireless communication provisioning of a wireless communication device operating in a carrier network including at least one carrier tower comprising:
   a processor; and
   a memory coupled with the processor, wherein the memory is configured to provide the processor with instructions which when executed cause the processor to:
      receive a carrier network authentication request or a call detail record (CDR) associated with one or more identifiers;
      determine a current provisioning state associated with the one or more identifiers;
      determine a next provisioning state associated with the one or more identifiers;
      determine a state transition rule associated with the one or more identifiers wherein the state transition rule defines a transition between the current provisioning state and the next provisioning state;
      determine a provisioning instruction according to an occurrence of a transition condition and an application of the state transition rule utilizing at least one of the carrier network authentication request or the CDR; and
      transmit the provisioning instruction to at least one of an Authentication Center (AuC), a Home Location Register (HLR), a Gateway GPRS Support Node (GGSN), a Billing system, or an Authentication Authorization Accounting (AAA) system according to the state transition rule.

2. A system as in claim 1, wherein the current provisioning state comprises a non-billable state and the next provisioning state comprises a billable state.

3. A system as in claim 1, wherein the current provisioning state comprises a billable state and the next provisioning state comprises a non-billable state.

4. A system as in claim 1, wherein the current provisioning state comprises one or more of the following: a state name, a state description, a required state flag, a prerequisite state, an allowed next state, an exclusivity rule, or a transition mode.

5. A system as in claim 1, wherein the current provisioning state allows at least one of the following: an authentication for communication, an authorization for communication, an automatic transition to the next provisioning state, an activated state or no billing for communication.

6. A system as in claim 1, wherein an identifier of the one or more identifiers comprises at least one of the following: a SIM, a ICCID, or an IMSI.

7. A system as in claim 1, wherein the state transition rule comprises indicating an automated state transition based on the transition condition.

8. A system as in claim 1, wherein the transition condition is based on one or more of the following: a predetermined amount of elapsed time since a prior state transition, an amount of service usage above a predetermined amount of service usage, and a network registration.

9. A system as in claim 1, wherein the state transition rule is defined for a wireless communication device.

10. A system as in claim 1, wherein the state transition rule is defined for a first wireless communication device that is different from the state transition rule for a second wireless communication device.

11. A system as in claim 1, wherein the state transition rule is defined for a group of wireless communication device.

12. A system as in claim 1, wherein a customer selects the state transition rule.

13. A system as in claim 1, wherein a customer defines the state transition rule.

14. A system as in claim 1, wherein a customer defines the current provisioning state.

15. A system as in claim 1, wherein a customer defines the next provisioning state.

16. A system as in claim 1, wherein the current provisioning state does not include support for a communication session.

17. A system as in claim 16, wherein upon entering the current provisioning state, terminating an existing communication session.

18. A system as in claim 1, wherein the transition rule when activated terminates existing communication sessions.

19. A system as in claim 1, wherein the current provisioning state allows a communication device to pass traffic without incurring any billing charges, and wherein the state transition rule allows an automated transition to the next provisioning state, and wherein the next provisioning state incurs billing charges.

20. A system as in claim 1, wherein the current provisioning state allows a communication device to pass traffic without incurring any billing charges, and wherein the state transition rule allows an automated transition to the next provisioning state, and wherein the next provisioning state does not allow the communication device to pass traffic.

21. A system as in claim 1, wherein the state transition rule comprises indicating a manual state transition based on one or more of the following transition conditions: an action through a manager portal, by uploading a file to the SIM or device with the SIM, or an application programming interface (API) call.

22. A system as in claim 1, wherein an identifier of the one or more identifiers comprises at least one of the following: a customer identifier, a user identifier, or a device identifier.

23. A method for wireless communication provisioning of a wireless communication device operating in a carrier network including at least one carrier tower comprising:
   receiving a carrier network authentication request or a call detail record (CDR) associated with one or more identifiers;
   determining a current provisioning state associated with the one or more identifiers;
   determining a next provisioning state associated with the one or more identifiers;
   determining a state transition rule associated with the one or more identifiers wherein the state transition rule defines a transition between the current provisioning state and the next provisioning state;
   determining a provisioning instruction according to an occurrence of a transition condition and an application of the state transition rule utilizing at least one of the carrier network authentication request or the CDR; and
   transmitting the provisioning instruction to at least one of an Authentication Center (AuC), a Home Location Register (HLR), a Gateway GPRS Support Node (GGSN), a Billing system, or an Authentication Authorization Accounting (AAA) system according to the state transition rule.

24. A computer program product for wireless communication provisioning of a wireless communication device operating in a carrier network including at least one carrier tower, the computer program product being embodied in a non-transitory computer readable medium and comprising computer instructions to:

receive a carrier network authentication request or a call detail record (CDR) associated with one or more identifiers;

determine a current provisioning state associated with the one or more identifiers;

determine a next provisioning state associated with the one or more identifiers;

determine a state transition rule associated with the one or more identifiers wherein the state transition rule defines a transition between the current provisioning state and the next provisioning state;

determine a provisioning instruction according to an occurrence of a transition condition and an application of the state transition rule utilizing at least one of the carrier network authentication request or the CDR; and transmit the provisioning instruction to at least one of an Authentication Center (AuC), a Home Location Register (HLR), a Gateway GPRS Support Node (GGSN), a Billing system, or an Authentication Authorization Accounting (AAA) system according to the state transition rule.

* * * * *